A. E. DRISSNER.
DIE OR TAP HOLDER FOR AUTOMATIC SCREW MACHINES.
APPLICATION FILED JAN. 22, 1917.
1,294,428.  Patented Feb. 18, 1919.
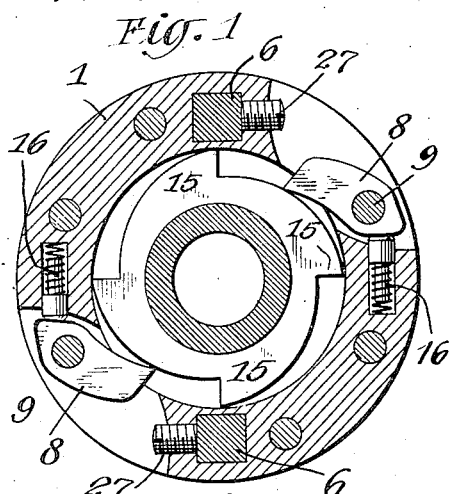
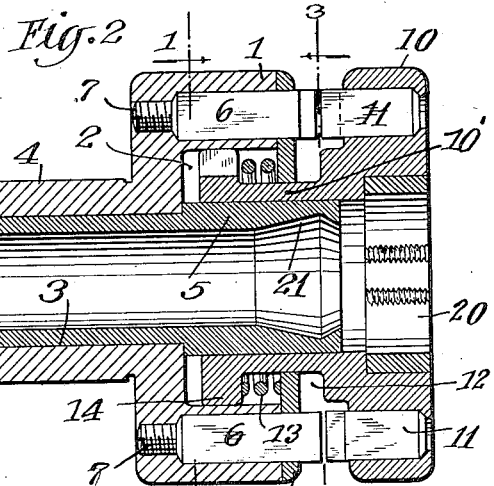
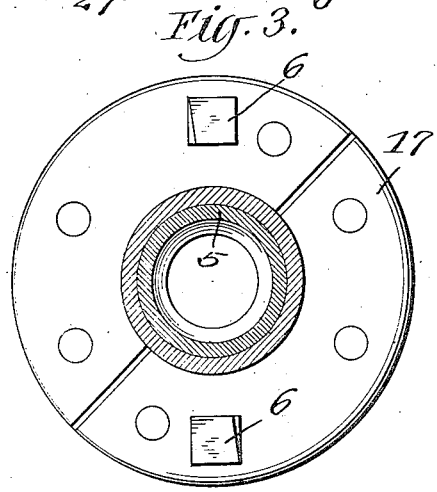
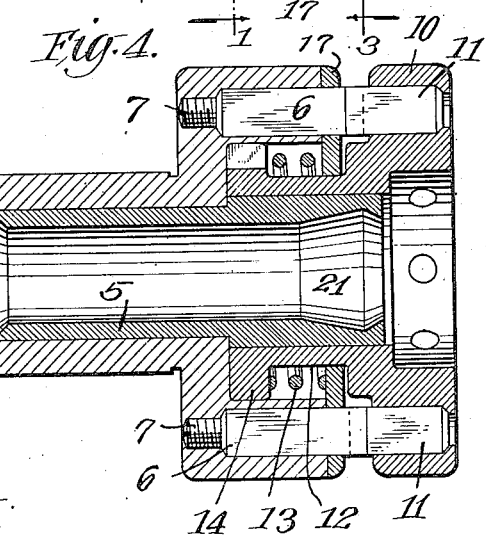
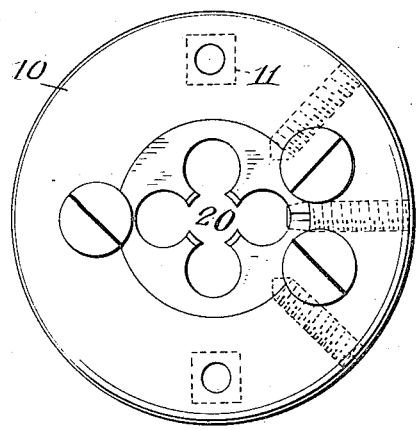

UNITED STATES PATENT OFFICE.

ALFRED E. DRISSNER, OF CLEVELAND, OHIO, ASSIGNOR TO THE NATIONAL-ACME COMPANY, OF CLEVELAND, OHIO, A CORPORATION OF OHIO.

DIE OR TAP HOLDER FOR AUTOMATIC SCREW-MACHINES.

1,294,428.   Specification of Letters Patent.   Patented Feb. 18, 1919.

Application filed January 22, 1917. Serial No. 143,718.

*To all whom it may concern:*

Be it known that I, ALFRED E. DRISSNER, a citizen of the United States, residing at Cleveland, in the county of Cuyahoga and State of Ohio, have invented certain new and useful Improvements in Die or Tap Holders for Automatic Screw-Machines, of which the following is a specification.

This invention relates to die or tap holders of that class particularly adapted for use with automatic screw machines, and the object of the invention is to provide an improved die or tap holder by means of which it is possible in an automatic machine of the class described, either single spindle or multiple, to tap or thread the work exactly to the same point desired each and every time.

In the drawings accompanying and forming part of this specification Figure 1 is a cross-sectional view of this improved die or tap holder taken in line 1—1 Fig. 2 looking in the direction of the arrow; Fig. 2 is a longitudinal sectional view of the improvement with the driving pins disengaged; Fig. 3 is a cross-sectional view taken in line 3—3 Fig. 2 looking in the direction of the arrows; Fig. 4 is a longitudinal sectional view, similar to Fig. 2, but showing the driving pins engaged; and Fig. 5 is a front view of the tap or die carrier.

Similar characters of reference indicate corresponding parts in the several figures of the drawings.

This improved die or tap holder comprises a die body 1 having a stem adapted to be attached to a suitable die spindle not shown, and a die holder 10. The body 1 has a bore 2 of a suitable diameter and depth to receive therein a portion of the die holder 10 as hereinafter described. This bore 2 communicates with a bore 3 of smaller diameter extending through the stem 4. Into the bore 3 of the stem 4 is housed a suitable bushing 5, and this bushing projects into and beyond the front face of the die body 1. The bore of this bushing 5 on the projecting end thereof just described is provided with an enlarged compound angular bore 21 which facilitates the flow of oil to the die or tap. By making this bore of angular form the oil flows in a much closer volume and is more effective than if the bore was straight. Located in openings of the body 1 between the outer periphery thereof and the bore 2 and parallel with the bore are square driving pins 6, which project a suitable distance beyond the front face of the body 1, these pins being provided with beveled ends. Located in the body to engage the inner ends of these pins 6 are suitable adjusting screws 7. In the front face of the body 1 a suitable distance away from these pins are machined grooves or stations in which are housed ratchet pawls 8 mounted on suitable pins 9.

The die holder 10 has a diameter at the front thereof corresponding to that of the die body 1, and it is also provided with squared pins 11 having beveled ends and which pins are in line with the pins 6 of the die body and project a suitable distance beyond the rear face of the die holder 10, so as to properly mate with the pins 6 of the die body. Directly back of these pins 11 of the die holder 10 the die holder is reduced for a suitable distance to provide a groove or recess 12 terminating in a flange 14 of suitable width, and located in this recess is a coiled or spiral spring 13. The flange 14 is provided on its periphery with a plurality of ratchet teeth 15 adapted to coöperate with the ratchet pawls 8. The rearwardly projecting portion 10' of the die holder 10 is housed over the bushing 5 carried by the stem 4 of the die body and enters the large bore 2 of the die body 1, so that the ratchet teeth on the periphery of the flange of this projection 10' will mate with the ratchet pawls of the die body 1. Each of these pawls is held in its proper position by spring and plunger 16. The die body 1 and the die holder 10 are held in the assembled position shown in Figs. 2 and 4 by means of a plate 17 (see also Fig. 3) which is made in two parts to facilitate assembling. This plate has a bore of the same diameter as the recessed portion 12 of the die holder 10 so as to extend into such recess, it being secured by suitable screws to the front face of the die body 1, thus holding the body and holder and the ratchet pawls and spring in their proper positions.

The front face of the die holder 10 is suitably bored to receive a die 20, secured in position by the means shown in Fig. 5. Various ways, however, of securing the die in place may be used, and where a tap is used the method of mounting and securing it would, of course, be different, but so far as the operation of this improved die holder is concerned it is immaterial how the tap or die is mounted in the holder 10 or how it is secured therein.

In the operation of the die holder when the die has traveled on to the piece of work approximately to the point required the travel of the die spindle into which the stem of the die body is suitably secured, is arrested by suitable means. The die, however, will continue to cut and travel forward until the pins 6 and 11 of the die body 1 and holder 10 have cleared themselves, whereupon the travel of the die is entirely arrested, by reason of the fact of course that the pins 6 and 11 are thus disengaged, whereupon the ratchet pawls of the die body simply click over the teeth of the die holder. When the work spindle is reversed to unscrew the die the ratchet pawls, by reason of the work spindle running in the opposite direction, drop into engagement with the ratchet teeth on the inner end of the die holder and hold the die holder against revolving and so allow the die to unscrew from the work just threaded.

When the die holder carrying the die has released itself from the work in this manner the spring 13 forces it back into connection with the pins 6 of the die body 1.

This improved die or tap holder is a very sensitive mechanism and allows a heavy die spindle to thread as accurately for length as a light die spindle, and this mechanism can be used in connection with a work spindle that is running continually as well as a work spindle that is stopped for threading and started to release the die.

In addition to the adjusting screws 7 for adjusting the body pins lengthwise, screws 27 are provided for securing the pins firmly in place, similar screws being provided for the pins of the die holder.

I claim as my invention:

1. A die or tap holder comprising a body having a stem and an enlarged bore, and a holder, said body and holder having a pair of overlapping sliding portions within and spaced from the inner walls of said enlarged bore to form an annular chamber and also having mating pins, a spring within said annular chamber for holding the pins in engagement during the entire threading of the work and for returning the pins into engagement immediately the die is released from the work, said holder and body also having one a pawl and the other ratchet teeth carried by one of said overlapping sliding portions within said bore and coöperating with said pawl.

2. A die or tap holder comprising a body having a stem and an enlarged bore, and a holder, said body and holder having a pair of overlapping sliding portions within and spaced from the inner walls of said enlarged bore to form an annular chamber and also having mating pins, a spring within said annular chamber for holding the pins in engagement during the entire threading of the work and for returning the pins into engagement immediately the die is released from the work, said holder having ratchet teeth carried by the outer overlapping portion and said body having a pawl coöperating with said teeth.

3. A die or tap holder comprising a body having a bore therein and a stem communicating with said bore, a bushing carried by said stem and projecting forwardly of the bore of the body, a die holder projecting into the body bore and mounted on said bushing, a spring on said holder within said bore, pawl and ratchet mechanism carried by the body and holder within the body bore, and mating pins carried by the body and holder.

4. A die or tap holder comprising a body having a bore and a bushing projecting within said bore, a holder slidably mounted on said bushing, said body and holder having pawl and ratchet mechanism, a spring on said holder, and mating pins carried by the holder and body.

5. A die or tap holder comprising a body having a bore and a bushing projecting within said bore, a holder slidably mounted on said bushing, said body and holder having pawl and ratchet mechanism, a spring on said holder, and mating pins carried by the holder and body, said bushing having an angular bore for facilitating the feeding of the oil.

6. A die or tap holder comprising a bored body, a bushing projecting into said body bore, a die holder having a portion projecting into the body bore and slidably mounted on said bushing, a spring located on the projecting portion of said die holder, a plate fitting said projecting portion and secured to said body for holding the spring in place, pawl and ratchet mechanism carried by the body and projecting portion of the die holder within the body bore, and mating pins carried by the front and rear faces of the body and die holder.

7. A die or tap holder comprising a bored body, a bushing projecting into said body bore, a die holder having a portion projecting into the body bore and slidably mounted on said bushing, a spring located on the projecting portion of said die holder, a plate fitting said projecting portion and secured to said body for holding the spring in place, pawl and ratchet mechanism carried by the body and projecting portion of the die holder within the body bore, mating pins carried by the front and rear faces of the body and die holder, and means carried by the body for adjusting the pins thereof, lengthwise.

8. A die or tap holder comprising a bored body having a bushing projecting into the bore, a die holder of substantially the same diameter as the body and having a recessed projection extending into the bore of the body and slidingly mounted on said bushing, a spring located in the recess of said projection, a plate secured to the front face of said body and fitting the recess of said projection, said projection having its inner end provided with ratchet teeth and said body having spring pressed pawls adapted to coöperate with said teeth, and the body and holder having projecting mating pins.

9. A die or tap holder comprising a bored body having a bushing projecting into the bore, a die holder of substantially the same diameter as the body and having a recessed projection extending into the bore of the body and slidingly mounted on said bushing, a spring located in the recess of said projection, a plate secured to the front face of said body and fitting the recess of said projection, said projection having its inner end provided with ratchet teeth and said body having spring pressed pawls adapted to coöperate with said teeth, the body and holder having projecting mating pins, and means for adjusting the pins of one of said members.

10. A die or tap holder comprising a bored body having a bushing projecting into the bore, a die holder of substantially the same diameter as the body and having a recessed projection extending into the bore of the body and slidingly mounted on said bushing, a spring located in the recess of said projection, a plate secured to the front face of said body and fitting the recess of said projection, said projection having its inner end provided with ratchet teeth and said body having spring pressed pawls adapted to coöperate with said teeth, the body and holder having projecting mating pins, and means for adjusting the pins of the body.

11. A die or tap holder comprising a bored body having a bushing projecting into the bore, a die holder of substantially the same diameter as the body and having a recessed projection extending into the bore of the body and slidingly mounted on said bushing, a spring located in the recess of said projection, a plate secured to the front face of said body and fitting the recess of said projection, said projection having its inner end provided with ratchet teeth, and said body having spring pressed pawls adapted to coöperate with said teeth, the body and holder having projecting mating pins, and means for adjusting the pins of the body, said holder constructed to receive a die or tap, and said bushing having an angular bore to facilitate the supply of oil to the die or tap.

12. A die or tap holder comprising a body member, a holder member having substantially the same diameter, said members provided with one or more sets of mating pins, one of said members having a bore and a projecting portion, and the other a projection extending into said bore and slidingly mounted on said projecting portion, a spring located on said projection of one member and said members having coöperating pawl and ratchet mechanisms, the construction being such that the two members will be rotated by the pins when the same are in engagement, while one member can slide relatively to the other to disengage such pins.

13. A die or tap holder adapted for attachment to a spindle and comprising a body and a holder having mating pins and coöperating ratchet mechanism, said body comprising a stem and an enlarged bore, the body and holder having within said enlarged bore and spaced from the inner walls thereof to form an annular chamber a pair of overlapping sliding portions whereby the body and holder have a sliding engagement relatively to each other when the rotation of the die is stopped whereby the die holder will be drawn forward by the work to disengage the pins and when the work is reversed to unscrew the die the ratchet mechanism will hold the die against rotation and thereby permit the die to be unscrewed from the work, and means located within said annular chamber for holding the pins in engagement during the threading of the work.

14. A die or tap holder adapted for attachment to a spindle and comprising a body and a holder having mating pins and coöperating ratchet mechanism, said body comprising a stem and an enlarged bore, the body and holder having within said enlarged bore and spaced from the inner walls thereof to form an annular chamber a pair of overlapping sliding portions whereby the body and holder have a sliding engagement relatively to each other when the rotation of the die is stopped whereby the die holder will be drawn forward by the work to disengage the pins and when the work is reversed to unscrew the die the ratchet mechanism will hold the die against rotation and thereby permit the die to be unscrewed from the work, and means located within said annular chamber for holding the pins in engagement during the threading of the work, one part of said ratchet mechanism being carried by the body and the other by one of said overlapping sliding portions and one part of said ratchet mechanism having sufficient width to permit the sliding movement of the holder relatively to the body without disengaging the said ratchet mechanism.

15. A die or tap holder adapted for attachment to a rotatable spindle and comprising a body having a rearwardly projecting stem and an enlarged head having a bore therein, a holder having an enlarged head located in front of the head of the body and adapted to carry a threading tool, the holder and body having a pair of overlapping sliding portions within and spaced from the inner walls of the enlarged bore of the body head to form an annular chamber, said holder head and body head having respectively rearwardly projecting and forwardly projecting mating pins and said body and holder also having coöperating ratchet mechanism, a spring housed within the annular chamber and effective to hold the mating pins in engagement during the threading of the work and to return such pins into engagement after the threading tool is released from the work whereby when the rotation of the body is stopped the threading tool holder will be drawn forward by the work to disengage the pins and when the work is reversed to release the threading tool the ratchet mechanism will hold the tool holder against rotation and thereby permit the threading tool to be released from the work.

Signed at Windsor, in the county of Windsor and State of Vermont, this 19th day of January, 1917.

ALFRED E. DRISSNER.

Witnesses:
O. L. HENN,
A. G. JONES.